(12) United States Patent
Bagger et al.

(10) Patent No.: US 6,866,957 B1
(45) Date of Patent: Mar. 15, 2005

(54) SOLID OXIDE FUEL CELL AS WELL AS A METHOD OF MANUFACTURING SAID SOLID OXIDE FUEL CELL

(75) Inventors: Carsten Bagger, deceased, late of Roskilde (DK); by Randi Bagger, legal representative, Roskilde (DK)

(73) Assignee: Forskningscenter Risø (DK)

( * ) Notice: Subject to any disclaimer, the term of this patent is extended or adjusted under 35 U.S.C. 154(b) by 190 days.

(21) Appl. No.: 10/221,410

(22) PCT Filed: Mar. 9, 2001

(86) PCT No.: PCT/DK01/00157
§ 371 (c)(1),
(2), (4) Date: Apr. 7, 2003

(87) PCT Pub. No.: WO01/67534
PCT Pub. Date: Sep. 13, 2001

(30) Foreign Application Priority Data

Mar. 10, 2000 (DK) ........................................ 2000 00394

(51) Int. Cl.[7] ............................. H01M 8/12; H01M 8/24
(52) U.S. Cl. ............................. 429/30; 429/33; 429/34; 429/38; 429/39; 264/618
(58) Field of Search ............................. 429/30, 33, 34, 429/38, 39; 264/618

(56) References Cited

U.S. PATENT DOCUMENTS 5,256,499 A    10/1993    Minh et al. .................... 429/33

FOREIGN PATENT DOCUMENTS

EP           0974564 A1    1/2000
WO        WO 9209116 A1    5/1992

*Primary Examiner*—Hoa Van Le
(74) *Attorney, Agent, or Firm*—Brinks Hofer Gilson & Lione (57) ABSTRACT

A solid oxide fuel cell for oxidation of hydrogen, coal gas or methane, and comprising a solid oxide electrolyte which is preferably formed by YSZ, and where a thin layer of anode material is attached to the electrolyte, and where a fluid flow-controlling coupling layer furthermore is placed on both the anode and the cathode side. The fluid flow-controlling coupling layer is according to the invention formed by a number of mutually separated columns 13. Such a embodiment of the coupling layer ensures a material saving. Furthermore, the height of each cell can be reduced and thereby increase the power density.

25 Claims, 7 Drawing Sheets

SOLID OXIDE FUEL CELL AS WELL AS A METHOD OF MANUFACTURING SAID SOLID OXIDE FUEL CELL

TECHNICAL FIELD

The invention relates to a solid oxide fuel cell for oxidizing gases, such as methane, coal gas or hydrogen, and comprising a solid oxide electrolyte, which is preferably formed by YSZ, and where a thin layer of anode material is attached to the electrolyte, and where a fluid flow-controlling coupling layer is arranged on both the anode and the cathode side.

BACKGROUND ART

A solid oxide fuel cell is known which comprises a solid oxide electrolyte, a solid oxide cathode and a cermet anode. The operating temperature of a stack of solid oxide cells is approximately 1000° C. The electrolyte comprises a $Y_2O_3$—$ZrO_2$ mixed oxide, a so-called yttrium oxide-stabilized zirconium oxide (YSZ). The cathode comprises $LaMnO_3$ doped with Sr, Mg or Ca. The anode comprises a mixture of fine Ni-particles and YSZ. The nickel-YSZ-oxide cermet anode is for instance produced by mixing NiO with YSZ ($Zr_{1-x}Y_xO_{2-x/2}$). This oxide mixture is sintered on the electrolyte. When the cell is activated and fuel gas is fed in form of $H_2$ or $CH_4$ to the cermet anode, NiO is reduced to Ni. Such a cermet anode must be porous in such a manner that the fuel gas can penetrate and react with the $O^-$-ions from the YSZ electrolyte while simultaneously releasing electrons to the nickel metal. Thus the anode reaction can only take place in a transition area between the three phases YSZ, Ni and fuel gas. The anode reaction is as follows:

$CH_4(gas+O^-(YSZ)\text{-electrolyte})\text{-}CO_2(gas)+8e^-$ (in the Ni-metal).

In order to allow the electrons to be diverted, a passage or a percolation path must exist through the Ni-phase, and for this purpose the % by volume of Ni must exceed 35%.

The use of $CeO_2$ based anodes implies that a reduction by means of $H_2$ or $CH_4$ results in substoichiometric $CeO_{2-x}$, which can conduct both electrons and oxygen ions. Such an anode allows the oxidation of $H_2$ or $CH_4$ to be carried out across the entire surface, viz. the gas bordering surface, $e^-$ and $O^-$ simultaneously being accessible across the entire surface. The latter is of importance in connection with oxidation of $CH_4$, which is the main component in natural gas.

A coupling layer in form of end plates with channels for the supply of gas flows is arranged on both the anode and the cathode side. These end plates involve a relatively cost-intensive manufacture because they must be made of a relatively expensive ceramic material, and furthermore they require relatively much material. In addition, they take up relatively much room and increase the height of a stack of cells to an unnecessary extent.

BRIEF DESCRIPTION OF THE INVENTION

The object of the invention is to provide a solid oxide fuel cell which is less expensive to produce than hitherto known, and which in addition presents a higher power density than hitherto known.

A solid oxide fuel cell of the above type is according to the invention characterised in that the fluid-controlling coupling layer is formed by a number of preferably mutually separated columns. Such a shaping of the coupling layer ensures a material saving. Furthermore, the height of each cell can be reduced and thereby increase the power density.

According to a particularly advantageous embodiment, the columns are equidistantly arranged. The centre distance between the columns may for instance be 0.8 mm.

The invention relates also to a method of manufacturing a solid oxide fuel cell for oxidizing gases, such as methane, coal gas or hydrogen, and comprising a solid oxide electrolyte, which is preferably formed by YSZ, and where a fluid-controlling coupling layer in form of a number of mutually separated columns of ceramic material is furthermore arranged on both the anode and the cathode side. The method is characterised in that columns are stamped out of a plate of the ceramic material, where said columns may be fixed to a layer of paper, whereafter said columns are sintered after being arranged on both the anode and the cathode side. As a result a particularly simple method is obtained for the manufacture of a solid oxide fuel cell. This method provides furthermore several degrees of freedom with respect to choice of material, which is an essential factor in connection with the mechanical stresses that the materials are subjected to at the operating temperatures in question.

BRIEF DESCRIPTION OF THE DRAWINGS

The invention is explained in greater detail below with reference to the accompanying drawings, in which.

BEST MODE FOR CARRYING OUT THE INVENTION

Figure 1:
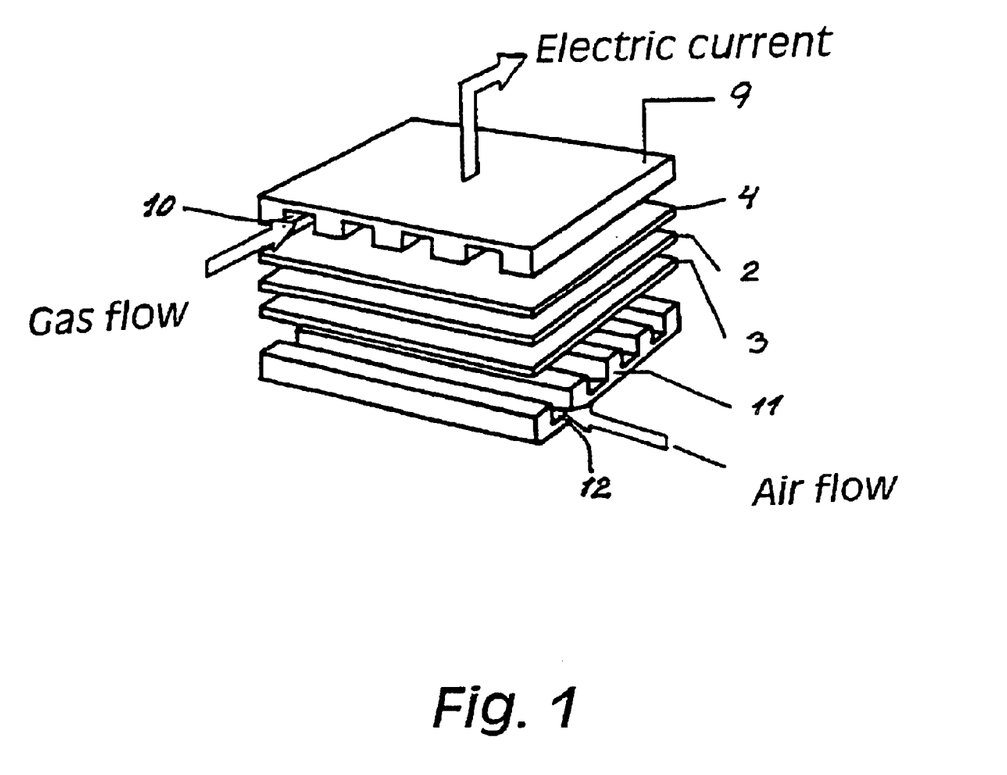
FIG. 1 illustrates a conventional fuel cell arranged between two coupling layers with gas channels.

FIG. 1 illustrates a known solid oxide fuel cell comprising an anode in form of a layer of Ni-YSZ-cermet, a layer of a YSZ-electrolyte 2 and a cathode 3 in form of a layer of $La(Sr)MnO_3$. The thickness of both the electrodes and the electrolyte is typically 100 $\mu m$. Considerable variation possibilities do, however, apply, from a few $\mu m$ and up to 0.3 mm for the electrolyte and up to 1 mm for the electrodes. An Ni-YSZ-anode is not particularly suited for oxidation of $CH_4$, and it has therefore been replaced by a $CeO_2$-based anode 4.

One measure of preventing $CeO_2$ from diffusing into YSZ is to add NiO or another transition metallic oxide or auxiliary oxide surfactive on YSZ to $CeO_2$. Another measure is to paint a layer of such a metallic oxide powder suspended in a dispersant on the YSZ electrolyte 2, whereafter the $CeO_2$ powder is applied. The expression surfactive is to be construed such that the auxiliary oxide, such as $MnO_2$ or NiO, is easy to distribute uniformly across the YSZ surface, and that the following heat treatment does not cause said auxiliary oxide to get lumpy on the surface. The measure can optionally be carried out by mixing up to 30% by weight of NiO into the $CeO_2$-based ceramic powder. It is assumed that a much lower content of NiO suffizes. Other possible auxiliary oxides are oxides of the transition metals V, Cr, Mn, Fe, Co, Ni, Cu, Zn, Nb, Ta and of Ga, Ge, In, Sn, Sb, Pb and Bi.

The effect of the auxiliary oxide is that the YSZ surface is completely covered by said auxiliary oxide and thereby prevents $CeO_2$ from diffusing into YSZ, and furthermore that said auxiliary oxide almost glues YSZ and $CeO_2$ together in connection with a low interfacial tension between said YSZ and $CeO_2$. In order to be usable in a solid oxide fuel cell, the auxiliary oxide layer serving as glue layer must be penetrable to oxygen ions when the fuel cell operates. The use of NiO as auxiliary oxide has the effect that during the starting procedure NiO is likely to be reduced to metallic Ni at the interaction of hydrogen. As the molar volume of Ni is no more than 6.6 $cm^3$/mole, and as the molar volume of NiO is 11.2 $cm^3$/mole, a considerable contraction takes place. As a result $CeO_2$ is brought into direct contact with YSZ, whereby $O^-$ ions fairly freely can move from YSZ into $CeO_2$.

If the Ni resulting from the reduction of NiO appears on the CeO, surface as particles of a diameter of approximately 1 $\mu$m or more, problems are likely to arise in connection with the oxidation of $CH_4$, Ni being a well-known cracking catalyst. Ni exposed to $CH_4$ at 1000° C. is therefore assumed to cause a liberation of coal, which gradually destroys the anode. In order to avoid the latter, it is possible to ensure that no Ni on the whole is visible on the $CeO_2$ surface, for instance by NiO only being applied as a layer on the YSZ electrolyte and not mixed with $CeO_2$. Such a procedure can for instance also be obtained by allowing the Ni-metal to be exposed to $CH_4$ at the surface and by treating said surface with $H_2S$ in return at the start. When Ni is exposed to $H_2S$ at 1000° C., an NiS layer is formed on the Ni particles with the effect that the cracking-catalytic properties no longer apply. As a result it is possible to improve the conductivity of the $CeO_{2-x}$ electrode by adding up to 35 to 40% by weight of Ni. The treatment with $H_2S$ has the effect that the ability of Ni to liberate coal from $CH_4$ in connection with cracking is eliminated.

Compared to an Ni-YSZ cermet electrode, an Ni—$CeO_{2-x}$ electrode treated with $H_2S$ tolerates a possible sulphur content in $CH_4$. An essential problem associated with the classic Ni-YSZ cermet is that it is inactivated if it is exposed to a sulphur content in the fuel gas of the magnitude 100 ppm for a prolonged period of time. Ni-free $CeO_2$-based electrodes are also assumed to tolerate sulphur.

A particular problem associated with $CeO_2$ based electrodes 4 is that such $CeO_{2-x}$ electrodes are often damaged because some of the $O^-$-ions are removed from the $CeO_{2-x}$ crystal lattice while some of the $Ce^{+4}$-ions are reduced to $Ce^{+3}$. As a result the crystal lattice expands both because less negative $O^-$-ions are present to keep the positive Ce-ions together and because a $Ce^{+3}$-ion is larger than a $Ce^{+4}$-ion. Apparently, a solution of the latter can be found as well.

When $CeO_2$ is doped with a tri or divalent metallic oxide, such as $Y_2O_3$ or CaO, solid solutions are formed, said solutions being of the type $$Ce_{1-y}Y_yO_{2-\frac{y}{2}}$$

or $Ce_{1-x}Ca_xCa_xO_{2-x}$. Once a deficiency of oxygen ions, viz. oxygen ion vacancies, is introduced into the $Ce_xCa_xO_{x-2}$ crystal lattice, it is rather difficult to achieve further oxygen ion vacancies as a result of the reduction of $Ce^{+4}$ to to $Ce^{+3}$. The process is as follows:

$$H_2+2Ce^{+4}+O^{2-}-2Ce^{+3}+vacancy+H_2O,$$

where the vacancies form part as species to the same extent as the ions in the crystal lattice. In other words, already introduced vacancies from a CaO doping displace the equilibrium towards the left.

When the formation of $Ce^{+3}$ and vacancies is slowed down by the addition of CaO, the electronic conductivity of the $CeO_2$-based electrode is reduced because the electronic conductivity derives from the outermost, loosely arranged electron in the $Ce^{+3}$-ion. Accordingly, when the $Ce^{+3}$ concentration is reduced, the conductivity is reduced as well. In order to increase the conductivity of the electrons it is possible to add substances, such as $Nb_2O_5$, where $Nb^{+5}$ is reduced more easily than $Ce^{+4}$. Also in $Nb^{+4}$ the outermost, loosely arranged electron is mobile. A measure of increasing the volume stability of $CeO_2$ is to dope with metallic oxides, where the metallic ion is smaller than $Ce^{+4}$. As a result, local stresses, viz. deformations, are introduced in $CeO_2$ capable of absorbing local increases in the volume, said increases arising during the formation of $Ce^{+4}$ through a reaction with $Ce^{+3}$.

The substances dopable to $CeO_2$ in order to improve the conductivity of the electrons are for instance $Nb_2O_5$, $Ta_2O_5$, $TiO_2$, $P_2O_5$, $As_2O_5$, $Sb_2O_5$, $Bi_2O_3SnO$, $In_2O_3$ and $SO_3$ or mixtures thereof or substances resulting in the same mixture by an addition of $CeO_2$ followed by a heat treatment, such as the carbonates of the same metals or for instance $Ce(SO_4)_2$ in stead of $SO_3$ or $CePO_3$ in stead of $P_2O_5$.

The substances dopable to $CeO_2$ in order to improve the stability of the volume by way of reduction are metallic oxides, where the metallic ion is mono, di or trivalent, such as $Na_2O$, $K_2O$, MgO, CaO, SrO, BaO, $Sc_2O_3$, $Y_2O_3$, $La_2O_3$, $In_2O_3$, $Ga_2O_3$ as well as tri and divalent lanthanides, $Ti_2O_3$, ZnO, $Al_2O_3$. Oxides with metallic ions smaller than $Ce^{+4}$ are apparently particularly suited.

Figure 4:
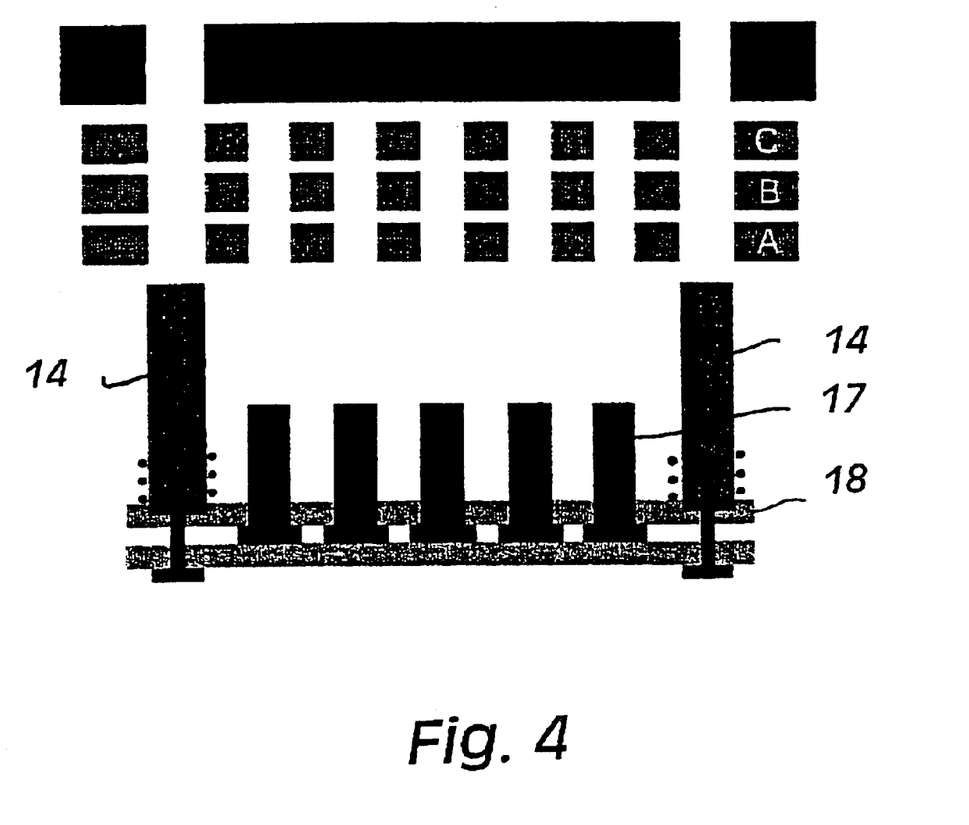
FIG. 4 illustrates how the ceramic material can be formed into columns.

FIG. 1 illustrates the individual fuel cell repeated in a stack. The fuel cell comprises a first end plate 9 with some channels 10 for a gas flow, anode 4 (acting as a fuel electrode), an electrolyte, an air electrode and a send plate 11 with channels 12 extending transverse to the channels in the first end plate. The fuel gas is fed to the cells at a pressure of approximately 1 to 10 atm. It can for instance be a cell stack in a manifold, cf. FIG. 4 showing the inlet and outlet openings 5, 6, 7, 8 for air and fuel gas, respectively. Furthermore, some flow-controlling coupling layers of a number of columns 13 shown as a wavy material, said coupling layers providing some elongated channels for fuel gas and air, respectively. As a result, the flow direction of the air extends transverse to the flow direction of the fuel gas. The voltage across each cell is approximately 0.7 V at an operating temperature of approximately 1000° C. Below it has been shown how the operating temperature can be lowered, cf. Danish Patent Application No. PA 1999 00623.

Figure 2:
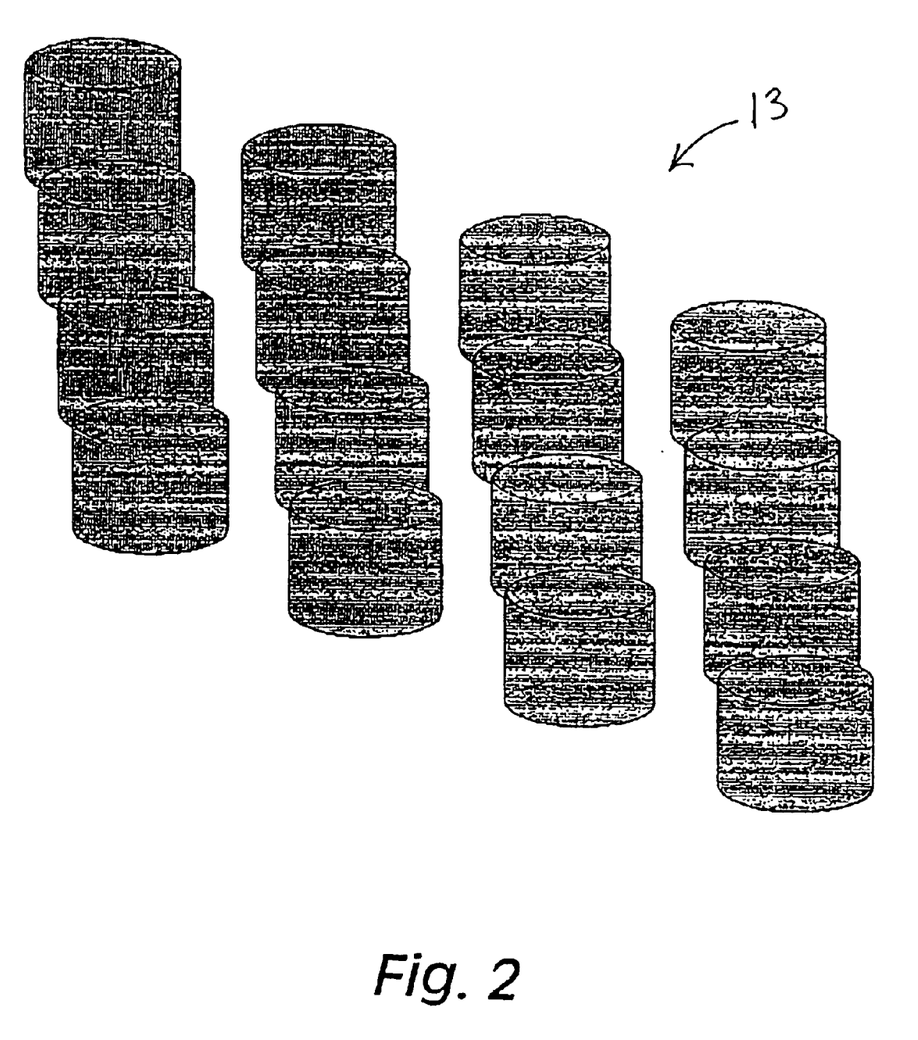
FIG. 2 illustrates a coupling layer in form of a high number of columns of ceramic material.

The flow-controlling coupling layers are according to the invention formed by column layers, cf. FIG. 2. Each column layer comprises a number of columns 13, which are preferably mutually separated. The columns 13 may be of almost any arbitrary dimension and be arranged according to desire. However, the columns 13 are preferably cylindrical, and they are preferably equidistantly arranged with a centre distance of approximately 1.8 mm.

Figure 3:
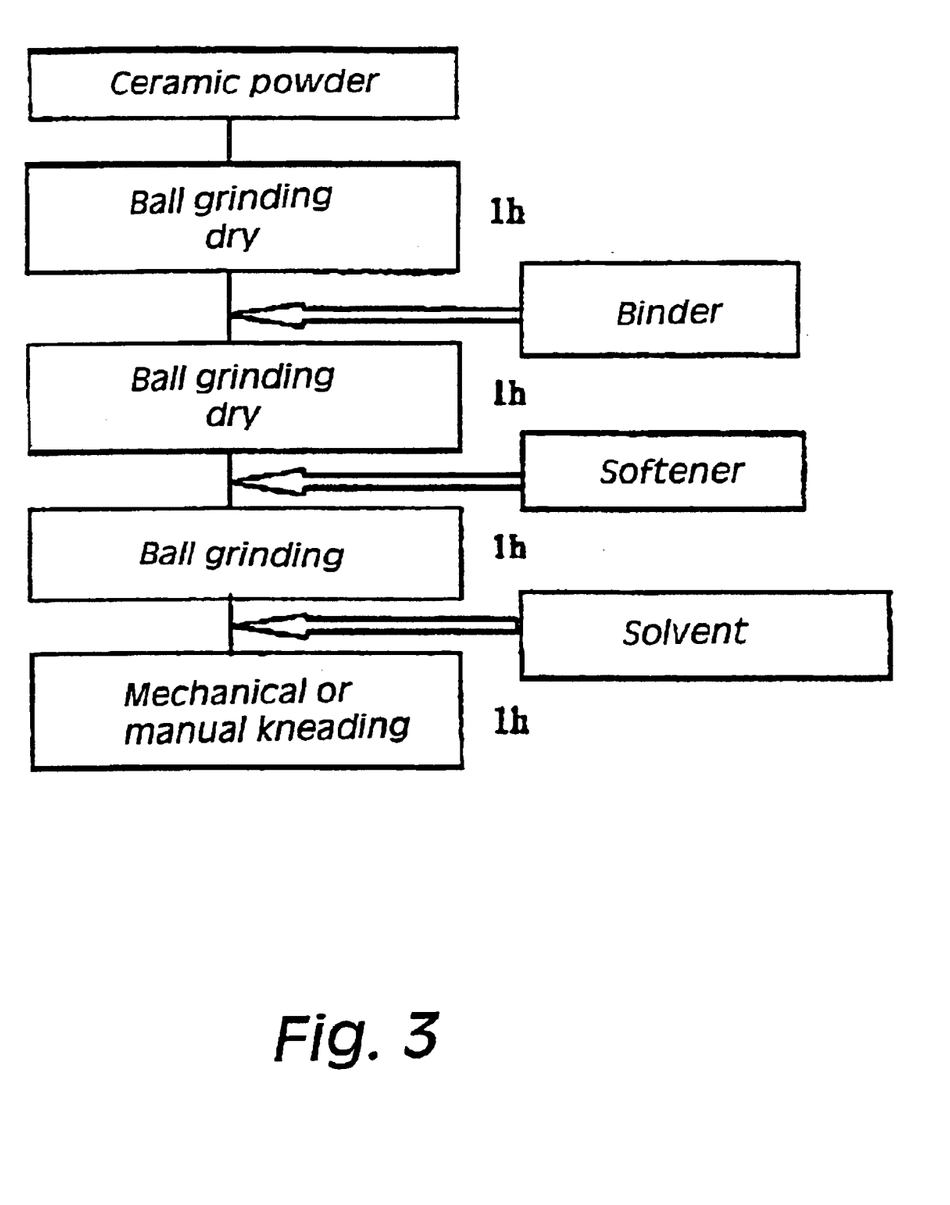
FIG. 3 illustrates how the ceramic material can be manufactured.

A manufacturing method has been developed, whereby columns of a height of 0.5 to 1.0 mm and a diameter of 1 mm are embossed in of ash-less paper. The manufacturing method is illustrated in FIG. 3 and has been optimized in such a manner that the waste of material has been reduced to almost zero. The column layer of the ashless paper can be handled, and the paper burns during sintering with the result that the columns 13 are left in the desired arrangement provided said procedure is carried out at a suitable load.

A water-based binder system is used, said binder system comprising methyl-hydroxy-ethyl-cellulose (Tylose MH300P, Hoechst or Tylose MH 300P2, Clariant) and polyethylene glycol 400 (PEG for synthesis, Merck-Schuchardt). The procedures used for mixing the viscous masses are shown in FIG. 3. The dry mixture is subjected to a ball milling in a bottle of polypropylene. The desired amounts of water are added during mixing in either a Z-mixer (Werner und Pfleiderer Type LDUK 3IInS) for one hour or by hand mixing. Examples of used plastic compositions are indicated in Table 1. The grain size of the precursor powder is, however, not critical.

Some moulds for stamping out the columns 13 are shown in FIG. 4. One mould A comprises a perforated steel plate, cf. FIG. 4, for providing a layer of a number of columns arranged in a matrix. Sprigs 17 in the lower mould have a diameter of 1.1 mm and are placed with a minimum distance of 0.3 mm. Some springs of a diameter of approximately 1 mm are optionally provided in some corresponding holes in superposed mould B.

Figure 5:
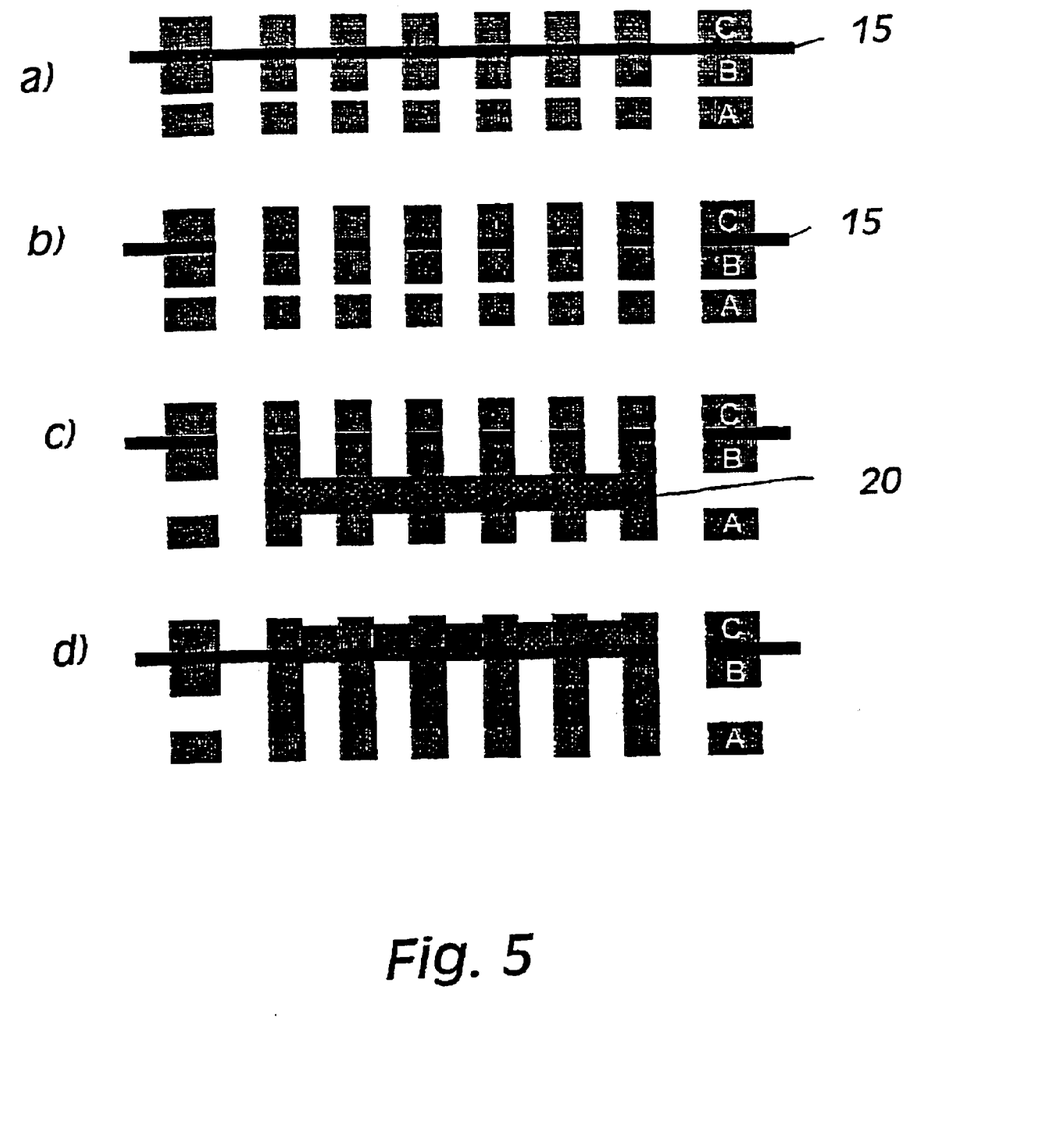
FIG. 5 shows the stamping tools used for this purpose.

The entire stamping arrangement comprises the following parts, cf. FIGS. 4 and 5:

- A flat bottom 18 with four holes for the fixation of some steel columns 14 of a diameter of for instance 1 cm.
- 4 fixation columns 14 of a diameter of for instance 1 cm.
- Superposed moulds optionally comprising springs in the desired arrangement. The springs are of a diameter

TABLE 1

Examples of composition of used viscous masses.

| | | | COMPOSITION | | | | | | |
|---|---|---|---|---|---|---|---|---|---|
| | | | NiO | | 8YSZ | | | | |
| MASS | ACC | CCC | Raw wt % | Calc. wt % | Fine wt % | Coarse wt % | LSM$^§$ wt % | PEG wt % | Tylose wt % | H2O wt % |
| NYZ-99-1 | * | | — | 41.3 | 6.5 | 26.2* | — | 4.4 | 5.0 | 16.6 |
| NYZ-99-2 | * | | 41.9 | — | 6.6 | 26.4* | — | 4.6 | 5.0 | 15.5 |
| LSM-99-2 | | * | — | — | — | — | 72.4 | 5.5 | 3.3 | 18.7 |
| LSM-99-3 | | * | — | — | — | — | 59.5 | 4.5 | 2.7 | 38.1 |

*Tosoh TZ-8Y, calcined at 1400° C., $d_{50\%} = 28$ μm & $d_{max} = 45$ μm
$^§$La$_{0.71}$Sr$_{0.3}$Mn$_{1.05}$O$_3$, $d_{50\%} = 5$ μm The plastic masses were shaped into sheets of a thickness of approximately 1 mm using a roller machine (Cavallin model 013) equipped with an Omron Sysdrive 3G3HV inverter for adjusting the roller speed. During the rolling, the masses were wrapped in plastic film (Vita Vrap) in order to minimize the evaporation of water. The sealed masses were furthermore rolled in a polyethylene bag (HDPE 70 μm) in order to avoid the curlings which might otherwise arise during the rolling of the thin sheets. During the rolling, the sheets were cut into desired dimensions and dried by one of the following procedures.

1. The cut sheets were placed between glass plates and dried at 60° C. 75% RH for more than 24 hours. The final drying was carried out at 120° C. until the weight was constant, corresponding to 0.5% by weight of H$_2$O.
2. Initially the cut sheets were dried in a microwave oven (Ide Line MI-2072, output power of approximately 34 W and a frequency of 2,450 MHz), where at least 4.5% by weight of water were removed. Some supports were then placed between the glass plates and dried at 110° C. for 17 to 24 hours (corresponding to a H$_2$O residue of approximately 0.5% by weight).

By the above drying procedures, the flatness of the resulting plate depended on the flatness of the plates between which the viscously processed plates were dried. The used glass plates have a flatness of ±25 μm). These processed plates are used directly for stamping columns out of the green ceramic layer in a 200 μm thick ash-less paper 15 (cf. FIG. 5), such as Whatman Cat. No. 141 150, This stamping renders it possible to fix the columns in the ash-less paper 15. In this manner the column layers can be manufactured in desired arrangements. The ash-less paper 15 is removed during the following heating, such as in a cell stack.

which is 15% smaller than the desired diameter, and they are of a height of for instance 4.3 mm.

Three perforated intermediate steel plates A, B and C, where the holes are 0%, 10% and 30%, respectively, larger than the desired column diameter.

Metal rings for the fixation columns 14 for adjusting the distance between the springs, if any, and the perforated plate C so as to provide sufficient room for the columns stamped out.

The perforated plate A is used for removing excess, viscously processed plate from the mould after the stamping out, cf. FIG. 5d. The use of such a plate implies that it is not necessary to require additional cleaning of the mould, and the excess material can be recycled merely by addition of water. The perforated plate B is used for stamping out the columns 13. The diameter of the holes of this plate B determines the diameter of the columns 13 being stamped out. The perforated steel plate C is used for supporting the ash-less paper 15 during the stamping procedure.

The first step of the manufacturing process is to adjust the ash-less paper 15. A viscously processed plate 20 is then positioned between the two plates A and B. The paper 15 in question and the perforated steel plate C are then placed atop the plate B. The fixation columns 14 serve to fix the plates relative to one another. The superposed mould with the springs is subsequently mounted. Now the stamping out procedure can be carried out either by means of a rubber hammer or by pressing the stamping parts against one another by means of a uniaxial press.

During the stamping procedure the sprigs 17 are pressed upwards into the ceramic plate. As a result, the ceramic columns are provided which are retained in the holes provided in advance in the paper layer. These ceramic columns simply stick to said paper layer.

Figure 6:
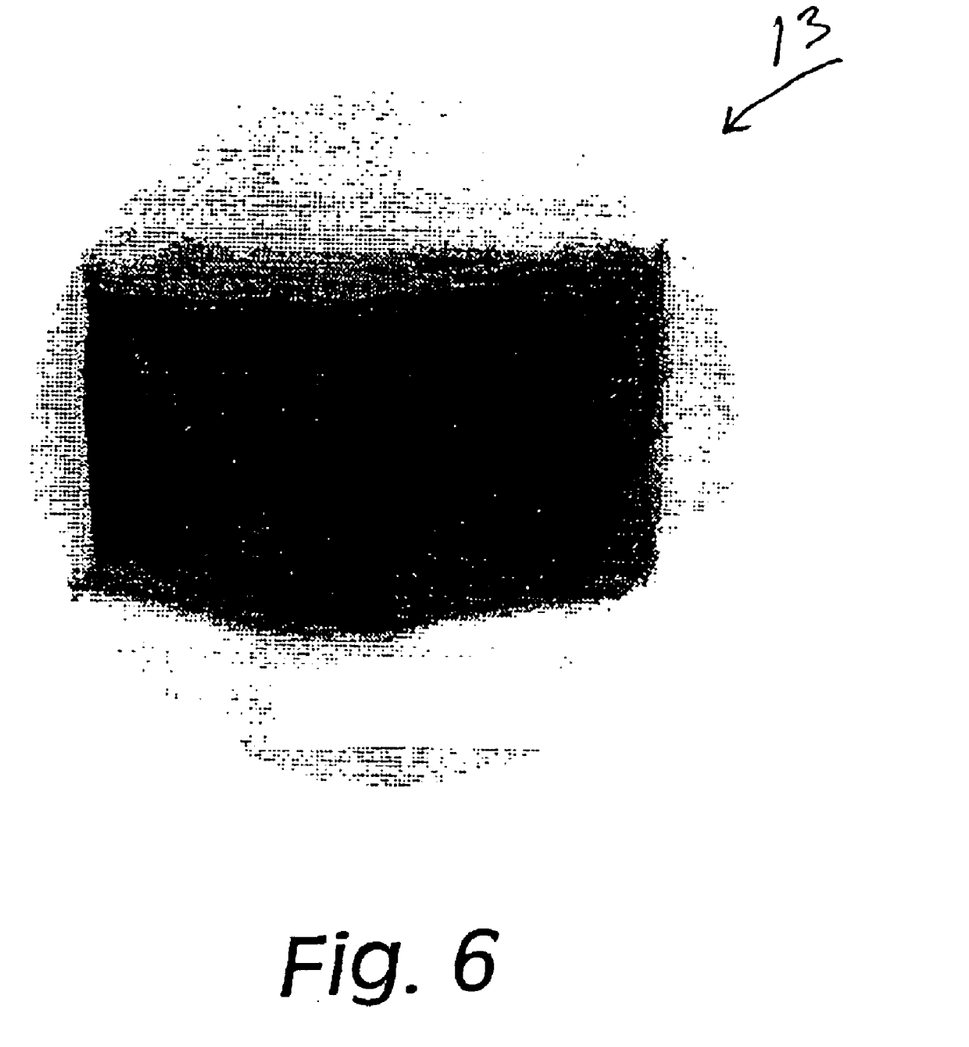
FIG. 6 illustrates a single column.

The water content of the viscously processed plate is important for the final result. Cylindrical columns 13 are provided by means of dry or almost dry plates, said columns 13 having a thickened foot if the plate contains too much water. A single column is illustrated in FIG. 6.

Figure 7:
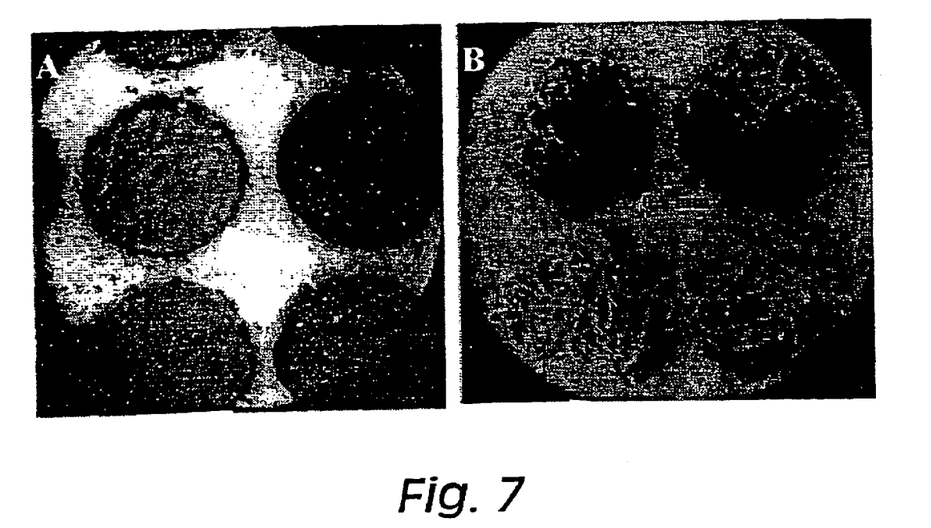
FIGS. 7 and 8 show photomicrographies of stamped column layers.
Figure 8:
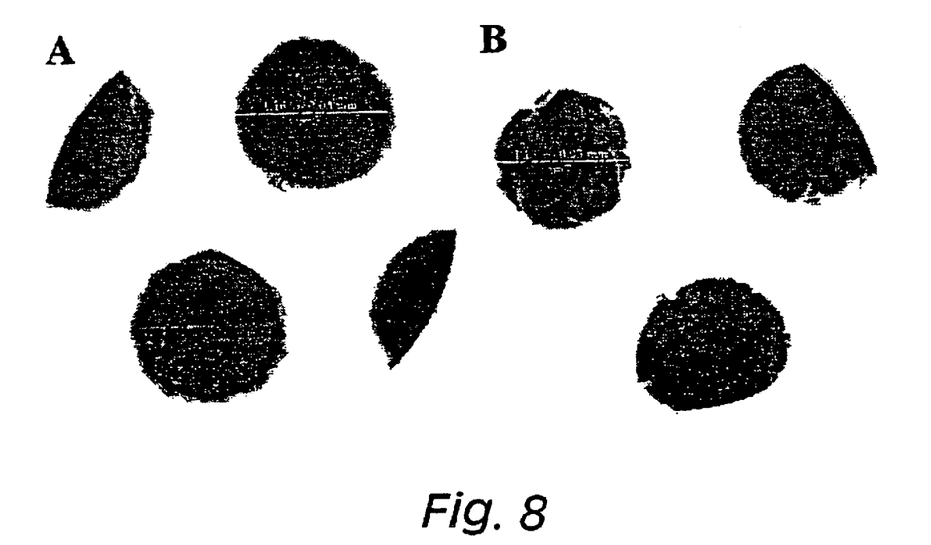

Not totally dry plates result in plates which are sensitive to the pressure by which the stamping is performed. Photomicrographies of columns layers stamped out appear from FIGS. 7 and 8. The columns illustrated in FIG. 8 are made of a dry, viscously processed plate which has been dried at 110° C. At the bottom side these columns 13 disclose some cracks, cf. FIG. 8B, caused by a dry precursor plate. However, the cylindrical shape of the columns 13 is easier to obtain by means of dry plates than by means of not totally dry plates. However, the ash-less paper 15 curls during the heating. Therefore, the individual columns 13 cannot maintain their position unless the sintering procedure is performed at a predetermined load, such as by a sintering of the LSM CCC-layer in a stack during the first heating period. A sintering of the column layer which is green by a load of 4.5 to 24.5 kPa at 850 to 1000° C. for two hours results in a column layer with a desired arrangement of the columns 13.

When a complete cell stack is to be provided, a layer of paper with columns is placed atop each cell. Then a disk of metallic interconnect is placed thereon followed by a sheet of paper with columns. These four elements are repeated. A stack of such elements is assembled, where one element is metallic, the second element is a sintered cell and the two remaining elements are soft non-sintered column elements. Now follows a heating to the operating temperature. Not until now organic components, such as a binder, disappear. During the heating to the operating temperature, the organic components adjust to their abutting surfaces, and the materials start to sinter together. The binder and the softener disappear as well during the heating to the operating temperature of 600° C.

Flow-controlling means can, if desired, be provided between the columns 13, said flow-controlling means comprising strings of a cylindrical or polygonal cross section and optionally being manufactured by way of extrusion of the binder-bound column material or by way of casting of strings with glass-bound sealing materials and arranged in the column plane. The strings can be mounted in the flow spaces between the columns a) in the existing spaces in the uniform column pattern, b) after removal of the columns where the strings are to be mounted, or c) after omission of the column extrusion where the flow-controlling strings are to be mounted.

The flow-controlling means render it possible to establish flow patterns optimizing the general design with respect to minimizing undesired effects, such as a) local temperature gradients caused by uneven area-specific effect development or power consumption, or b) admixing of fluids or gases from the two electrode sides where said fluids or gases may come into contact with one another.

Some of the sprigs can optionally be removed in response to the fluid-controlling means to be inserted.

What is claimed is:

1. A solid oxide fuel cell for oxidation of gases, including methane, coal gas or hydrogen, and comprising a solid oxide electrolyte, formed by YSZ, wherein a thin layer of anode material is attached to the electrolyte, wherein a fluid flow-controlling coupling layer is arranged on both the anode and the cathode side of the fuel cell, wherein the fluid flow-controlling coupling layer comprises a number of mutually separated columns, and wherein the columns comprise a material different from the thin layer of anode material.

2. A solid oxide fuel cell as claimed in claim 1, wherein the columns are equidistantly arranged.

3. A solid oxide fuel cell as claimed in claim 2, wherein the centre distance between the columns is approximately 1.8 mm.

4. A solid oxide fuel cell as claimed in claim 1, wherein each column has a height of approximately 0.5 to 1.0 mm.

5. A solid oxide fuel cell as claimed in claim 1, wherein each column has a diameter of approximately 1.0 mm.

6. A solid oxide fuel cell as claimed in claim 1, wherein the fuel cell further comprises flow-controlling means between the columns.

7. A solid oxide fuel cell as claimed in claim 1, wherein the columns comprise one of a ceramic material or a mixture of ceramics and metal.

8. A method of manufacturing a solid oxide fuel cell for oxidation of gases, including methane, coal gas or hydrogen, and comprising a solid oxide electrolyte, formed by YSZ, and wherein a fluid-controlling coupling layer comprising a number of mutually separated columns of a ceramic material on both the anode and the cathode side of the fuel cell, wherein the ceramic material comprises a material that differs from at least one of the anode or the cathode, the method comprising a stamping out columns from a plate of the ceramic material, wherein the columns are fixed to a layer of paper, whereafter the columns are subjected to a sintering after being placed on both the anode and the cathode side of the fuel cell.

9. A method as claimed in claim 8, further comprising subjecting the columns to a mechanical load during sintering.

10. A method as claimed in claim 9, wherein the columns are subjected to a mechanical load of 4.5 to 24.5 kPa at a temperature of 850 to 1000° C. for approximately two hours during sintering.

11. A method as claimed in claim 8, further comprising placing an interconnect disk on the columns.

12. A solid oxide fuel cell as claimed in claim 2, wherein each column has a height of approximately 0.5 to 1. mm.

13. A solid oxide fuel cell as claimed in claim 3, wherein each column has a height of approximately 0.5 to 1. mm.

14. A solid oxide fuel cell as claimed in claim 2, wherein each column has a diameter of approximately 1.0 mm.

15. A solid oxide fuel cell as claimed in claim 3, wherein each column has a diameter of approximately 1.0 mm.

16. A solid oxide fuel cell as claimed in claim 4, wherein each column has a diameter of approximately 1.0 mm.

17. A solid oxide fuel cell as claimed in claim 2, wherein the columns comprise one of a ceramic material or a mixture of ceramics and metal.

18. A solid oxide fuel cell as claimed in claim 3, wherein the columns comprise one of a ceramic material or a mixture of ceramics and metal.

19. A solid oxide fuel cell as claimed in claim 4, wherein the columns comprise one of a ceramic material or a mixture of ceramics and metal.

20. A solid oxide fuel cell as claimed in claim 5, wherein the columns comprise one of a ceramic material or a mixture of ceramics and metal.

21. A solid oxide fuel cell as claimed in claim 6, wherein the columns comprise one of a ceramic material or a mixture of ceramics and metal.

22. A solid oxide fuel cell as claimed in claim 2 wherein the fuel cell further comprises flow-controlling means between the columns.

23. A solid oxide fuel cell as claimed in claim 3 wherein the fuel cell further comprises flow-controlling means between the columns.

24. A solid oxide fuel cell as claimed in claim 4 wherein the fuel cell further comprises flow-controlling means between the columns.

25. A solid oxide fuel cell as claimed in claim 5 wherein the fuel cell further comprises flow-controlling means between the columns.

* * * * *